US006186575B1

(12) United States Patent
Fisher et al.

(10) Patent No.: US 6,186,575 B1
(45) Date of Patent: Feb. 13, 2001

(54) RE-CONFIGURABLE CARGO COVER

(75) Inventors: Kevin M. Fisher, Troy; David W. Cummings, Macomb Township; James R. Chesnick, Sterling Heights, all of MI (US)

(73) Assignee: General Motors Corporation, Detroit, MI (US)

(*) Notice: Under 35 U.S.C. 154(b), the term of this patent shall be extended for 0 days.

(21) Appl. No.: 09/330,721

(22) Filed: Jun. 11, 1999

(51) Int. Cl.[7] .......... B60P 7/02
(52) U.S. Cl. .......... 296/100.03; 296/100.2; 296/39.2; 296/37.6; 296/26.09
(58) Field of Search .......... 296/100.02, 100.03, 296/39.1, 39.2, 37.6, 26.08, 26.09

(56) References Cited

U.S. PATENT DOCUMENTS 2,090,815 * 8/1937 Simmons, Jr. .
3,291,520 12/1966 Smith .......... 296/24
4,394,100 * 7/1983 Sperlich .
5,154,478 * 10/1992 Erickson et al. .......... 296/39.2
5,265,993 * 11/1993 Wayne .
5,415,506 5/1995 Payne .......... 410/129
5,597,193 * 1/1997 Conner .......... 296/37.6
5,931,632 * 8/1999 Dongilli et al. .
5,979,963 * 11/1999 Jordon .......... 296/37.6

OTHER PUBLICATIONS

"UltraHatch" Product Literature, Syncorp, L.L.C., Date unknown, 2 pages.

* cited by examiner

*Primary Examiner*—D. Glenn Dayoan
*Assistant Examiner*—Mickki D. Murray
(74) *Attorney, Agent, or Firm*—Jeffrey A Sedlar

(57) ABSTRACT

A re-configurable cargo cover for a bed of a vehicle includes a door adapted to be disposed in a door opening of a vehicle body. The re-configurable cargo cover includes a plurality of individual panels operatively cooperating with each other and a bed of a vehicle. The re-configurable cargo cover includes a pair of interior sides operatively connected to sides of the bed of the vehicle. The re-configurable cargo cover further includes the panels and the sides having features cooperating with each other to re-configure the panels into a plurality of different configurations for a cargo area of the bed of the vehicle.

11 Claims, 2 Drawing Sheets

12
30
40
42
10
26
28
30
26
24
38
28
16

14
12
26
10
22
30
28
24
22
16
28
10
30
26
38
39
12
40
42
14
34
33
32
20

36
22
18
16
24
30
12
14
28
10
42
33
26
22
18
22
24
20

16

12
10
26
46
42
34
32
44
24
32
16
34

12
26
10
50
42
48
34
32
52
28
30

24
16

12
30
40
42
10
26
30
28
26
24
38

16
28

RE-CONFIGURABLE CARGO COVER

TECHNICAL FIELD

The present invention relates generally to cargo covers for vehicles and, more particularly, to a re-configurable cargo cover for a bed of a vehicle.

BACKGROUND OF THE INVENTION

It is known to provide a bed for a vehicle such as a pick-up truck. Typically, the bed is rectangular in shape to define a cargo area and is closed at the end by a tailgate. The tailgate is hinged to the bed to have an upright position to close the end of the bed and a down position to open the end of the bed.

Many of the pick-up trucks sold today have a cargo cover to cover the bed. The cargo cover is made as a one-piece panel of a relatively "strong/rigid" hard material to withstand predetermined strength and performance specifications. The cargo cover will only fit the bed for which it was designed.

Some pick-up trucks may include shorter beds or include crew/club or extended cabs that encroach into the space which would otherwise be employed for the cargo area. Short beds do not allow for loads of standard eight (8) foot materials to be transported with the tailgate in the closed position. Therefore, there is a need in the art to increase the flexibility of a cargo cover and useable space of the cargo area of a bed for a vehicle.

SUMMARY OF THE INVENTION

It is, therefore, one object of the present invention to provide a re-configurable cargo cover for a bed of a vehicle.

It is another object of the present invention to provide a re-configurable cargo cover that offers the flexibility for different configurations for a bed of a vehicle.

It is yet another object of the present invention to extend the cargo area of a bed of a vehicle.

To achieve the foregoing objects, the present invention is a re-configurable cargo cover for a bed of a vehicle. The re-configurable cargo cover includes a plurality of individual panels operatively cooperating with each other and a bed of a vehicle. The re-configurable cargo cover also includes a pair of interior sides operatively connected to sides of the bed of the vehicle. The re-configurable cargo cover further includes the panels and the sides having features cooperating with each other to re-configure the panels into a plurality of different configurations for a cargo area of the bed of the vehicle.

One advantage of the present invention is that a re-configurable cargo cover is provided for a bed of a vehicle. Another advantage of the present invention is that the re-configurable cargo cover has a plurality of panels to form a plurality of different configurations for a bed of a vehicle. Yet another advantage of the present invention is that the re-configurable cargo cover provides complete flexibility. Still another advantage of the present invention is that the re-configurable cargo cover has potential flexibility for storage compartments along with foldaway areas without intruding into the usable space and interfering with cargo tie downs. A further advantage of the present invention is that the re-configurable cargo cover offers the ability to extend the cargo area walls for additional cargo capacity rearward or to protect interior components when located forward into the occupant area.

Other objects, features and advantages of the present invention will be readily appreciated, as the same becomes better understood after reading the subsequent description taken in conjunction with the accompanying drawings.

DESCRIPTION OF THE PREFERRED EMBODIMENT

Figures 1, 2, 3A:
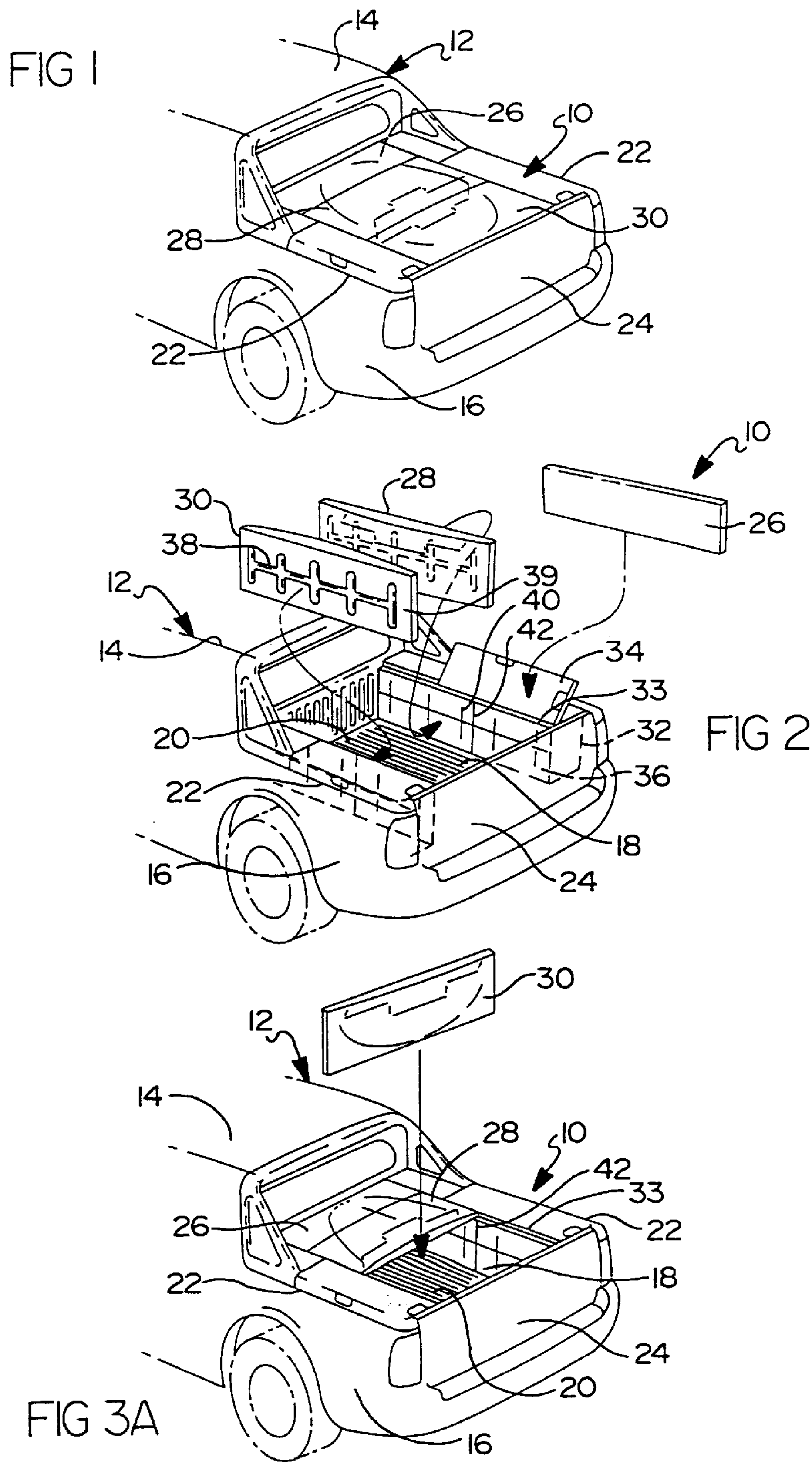
FIG. 1 is a perspective view of a re-configurable cargo cover, according to the present invention, illustrated in an installed position with a bed of a vehicle.
FIG. 2 is a perspective view of the re-configurable cargo cover and vehicle of FIG. 1 illustrating a stowed position configuration.
FIGS. 3A and 3B are perspective views of the re-configurable cargo cover and vehicle of FIG. 1 illustrating a rear partition storage compartment configuration.

Referring to the drawings and in particular FIGS. 1 and 2, one embodiment of a re-configurable cargo cover 10, according to the present invention, is shown for a vehicle such as a pick-up truck, generally indicated at 12. Such pick-up trucks 12 typically include a cab 14 (partially shown) and a bed 16 forming a cargo area 18. The bed 16 includes a floor 20, opposed sides 22 and a tailgate 24 that define the cargo area 18. It should also be appreciated that the pick-up truck 12 is conventional and known in the art.

Referring to FIGS. 1 through 5, the re-configurable cargo cover 10 includes a plurality of, preferably three, individual first, second and third panels 26, 28 and 30, respectively. The first, second and third panels 26, 28 and 30 are generally rectangular in shape and made of a relatively rigid material such as plastic to withstand predetermined strength and performance specifications. The second and third panels 28 and 30 have the same longitudinal length or width. The first panel 26 has a longitudinal length or width less than the second and third panels 28 and 30. The first, second and third panels 26, 28 and 30 can be reconfigured into a plurality of different and useful arrangements.

As illustrated in FIG. 1, the first, second and third panels 26, 28 and 30 are tabbed together by suitable means such as projections and recesses at their forward and rearward longitudinal edges to form a rigid single panel in an installed position to cover the cargo area 18. The cargo cover 10 can be rotated up from an outside edge of the third panel 30 with a hinge point located at the outside edge of the first panel 26. It should be appreciated that this arrangement allows easy access into the cargo area 18 of the bed 16 of the vehicle 12.

Referring to FIG. 2, the re-configurable cargo cover 10 can be re-configured to a stowed position. In this arrangement, the first panel 26 is stored inside one storage box 32 located on each side 22 of the bed 16 of the vehicle 12. The storage boxes 32 are generally rectangular in shape and secured to the sides 22 of the bed 16 by suitable means such as fasteners (not shown). The storage boxes 32 have a longitudinal recess 33 to support the panels 26, 28 and 30 therebetween. The storage boxes 32 have a top 34 pivotally attached by suitable means such as a hinge to an interior side 36 thereof for opening and closing the storage box 32. The second panel 28 and third panel 30 are stored on the interior sides 36 of the storage boxes 32. The panels 28 and 30 have "molded-in" features such as projections 38 on a bottom or inner surface 39 of the panels 28 and 30 that are disposed in recesses 40 on the interior sides 36 of the storage boxes 32. In the embodiment illustrated, the projections 38 and recesses 40 have a general "H" shape that is repeated longitudinally along the panels 28 and 30 and the interior side 36 of the storage boxes 32. It should be appreciated that the first panel 26 may be secured inside the storage box 32 by suitable means such as molded-in projections 38 to be disposed in corresponding recesses of the storage boxes 32 for attachment to the sides thereof. It should also be appreciated that the second and third panels 28 and 30 are stored near a center of the interior sides 36 of the storage boxes 32 to allow adequate clearance to cargo tie downs (not shown) located fore and aft of the cargo area 18.

Figure 3B:
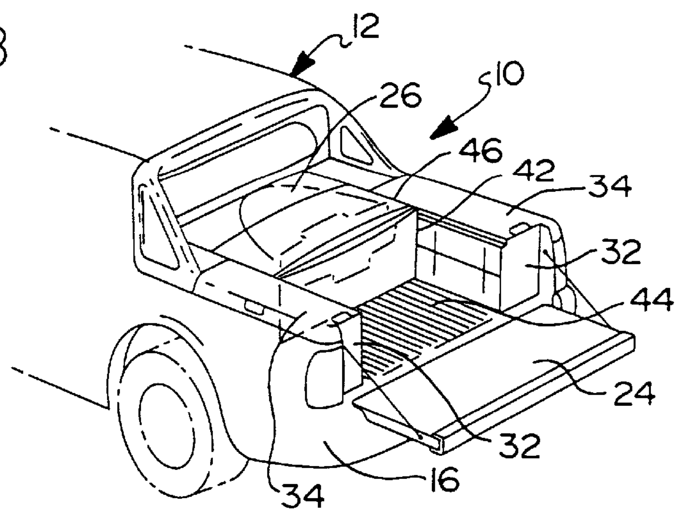

Referring to FIGS. 3A and 3B, the re-configurable cargo cover 10 can be reconfigured to a rear partition stowage compartment arrangement. In FIG. 3A, the first and second panels 26 and 28 are in the installed position as illustrated in FIG. 1. The third panel 30 is relocated in a vertical orientation across the bed 16 of the vehicle 12. The storage boxes 32 have at least one vertical channel 42 spaced longitudinally along each interior side 36 of the storage boxes 32. As illustrated in FIG. 3B, the third panel 30 has its lateral ends disposed in opposed vertical channels 42 to create an open cargo section 44. The first and second panels 26 and 28 are secured to each other and the first panel 26 is hinged to the bed 26 to create a swing open cargo section 46.

Figure 4:
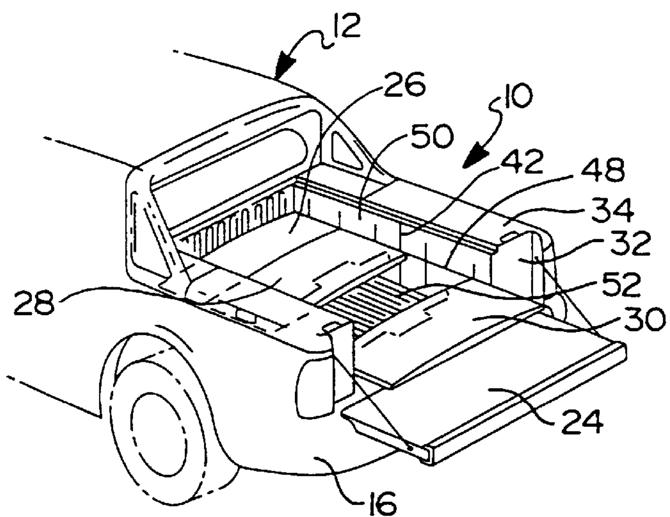
FIG. 4 is a perspective view of the re-configurable cargo cover and vehicle of FIG. 1 illustrating a tier cargo-loading configuration.

Referring to FIG. 4, the re-configurable cargo cover 10 can be re-configured to a tiered cargo loading arrangement. The storage boxes 32 have at least one horizontal channel 48 extending longitudinally along the interior sides 36 thereof. Either one of the first panel 26, second panel 28 and third panel 30 can have their lateral ends disposed in opposed horizontal channels 44 of the interior sides 36 of the storage boxes 32. As a result, the first, second and third panels 26, 28 and 30 create an upper open cargo section 50 and a lower closed cargo section 52.

Figure 5:
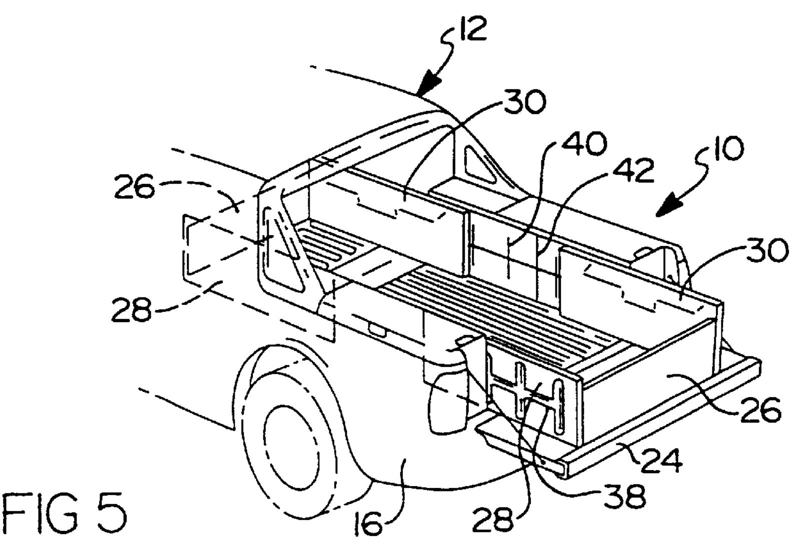
FIG. 5 is a perspective view of the re-configurable cargo cover and vehicle of FIG. 1 illustrating an extended loading enhancement configuration.

Referring to FIG. 5, the re-configurable cargo cover 10 can be re-configured to an extended loading enhancement arrangement. In this arrangement, the second panel 28 and third panel 30 are located vertically on the interior sides 36 of the storage boxes 32 similar to the stowed position of FIG. 2. The second and third panels 28 and 30 are positioned either forward into the cab 14 or rearward over the tailgate 24 using the molded-in projections 38 and 40. The first panel 26 is located at either end of the second and third panels 28 and 30 to complete a three sided box configuration utilizing the molded-in projections 38 and recesses 40.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A re-configurable cargo cover for a bed of a pick-up truck comprising:

first, second and third panels operatively cooperating with each other and a bed of a vehicle;

a pair of storage boxes having interior sides and being connected to sides of the bed of the vehicle; and said panels and said interior sides having molded-in features cooperating with each other to re-configure said panels into a plurality of different configurations for a cargo area of the bed of the vehicle including a first configuration wherein the plurality of individual panels cooperate to substantially cover the cargo area and including a second configuration wherein the plurality of individual panels are stowed wherein the first panel second and third panels are stowed outside the pair of storage boxes against the interior sides.

2. A re-configurable cargo cover as set forth in claim 1 wherein said panels are generally rectangular in shape.

3. A re-configurable cargo cover as set forth in claim 2 wherein said first panel has a longitudinal length less than a longitudinal length of said second panel and said third panel.

4. A re-configurable cargo cover as set forth in claim 3 wherein said second panel and said third panel have the same longitudinal length.

5. A re-configurable cargo cover as set forth in claim 1 including at least one vertical channel and at least one horizontal channel to receive lateral ends of said panels.

6. A re-configurable cargo cover as set forth in claim 1 including a top pivotally connected to each of said storage boxes.

7. A re-configurable cargo cover as set forth in claim 1 wherein said molded-in features comprise a plurality of vertical projections and at least one horizontal projection on each of said panels.

8. A re-configurable cargo cover as set forth in claim 7 wherein said molded-in features further comprise a plurality of vertical recesses and at least one horizontal recess, said vertical projections may be disposed in said vertical recesses and said horizontal projection may be disposed in said horizontal recess.

9. A re-configurable cargo cover as set forth in claim 1 wherein said interior sides each have a recess extending longitudinally for receiving each lateral end of said panels.

10. A cargo cover for a vehicle comprising:

a first panel having a first lateral end and a second lateral end;

a second panel having a third lateral end and a fourth lateral end;

a third panel having a fifth lateral end and a sixth lateral end;

wherein the vehicle includes a bed with a cargo area having interior sides with H-shaped recesses, wherein the second and third panels have projections that are receivable in the H-shaped recesses to stow the second and third panels against the interior sides, and wherein the first, second and third panels are configurable with the first, third and fifth lateral ends at one interior side and the second, fourth and sixth lateral ends at the other interior side to cover the cargo area.

11. A cargo cover according to claim 10 wherein the second and third panels are positionable vertically, partially against the interior sides and extending beyond the interior sides with the first panel located at an end of the second and third panels to complete a three-sided box configuration to extend the cargo area.

* * * * *